United States Patent
Oprea et al.

(10) Patent No.: US 9,635,049 B1
(45) Date of Patent: Apr. 25, 2017

(54) DETECTION OF SUSPICIOUS DOMAINS THROUGH GRAPH INFERENCE ALGORITHM PROCESSING OF HOST-DOMAIN CONTACTS

(71) Applicant: EMC IP Holding Company LLC, Hopkinton, MA (US)

(72) Inventors: Alina M. Oprea, Arlington, MA (US); Zhou Li, Malden, MA (US); Sang H. Chin, Cambridge, MA (US); Ting-Fang Yen, Sunnyvale, CA (US)

(73) Assignees: EMC IP Holding Company LLC, Hopkinton, MA (US); The Charles Stark Draper Laboratory, Inc., Cambridge, MA (US)

( * ) Notice: Subject to any disclaimer, the term of this patent is extended or adjusted under 35 U.S.C. 154(b) by 4 days.

(21) Appl. No.: 14/674,905

(22) Filed: Mar. 31, 2015

Related U.S. Application Data

(60) Provisional application No. 61/991,123, filed on May 9, 2014.

(51) Int. Cl.
 *H04L 29/00* (2006.01)
 *H04L 29/06* (2006.01)

(52) U.S. Cl.
 CPC .................. *H04L 63/145* (2013.01)

(58) Field of Classification Search
 CPC combination set(s) only.
 See application file for complete search history.

(56) References Cited

U.S. PATENT DOCUMENTS

| | | |
|---|---|---|
| 8,181,253 B1 | 5/2012 | Zaitsev et al. |
| 8,370,947 B2 | 2/2013 | Zaitsev et al. |
| 8,402,543 B1 * | 3/2013 | Ranjan ............... H04L 63/1416 709/223 |
| 8,413,247 B2 | 4/2013 | Hudis et al. |
| 8,516,585 B2 | 8/2013 | Cao et al. |
| 8,539,577 B1 | 9/2013 | Stewart et al. |

(Continued)

OTHER PUBLICATIONS

Belief Propagation-Based Trust and Reputation Management for P2P Networks pp. 578-586.*

(Continued)

*Primary Examiner* — Ghazal Shehni
(74) *Attorney, Agent, or Firm* — Ryan, Mason & Lewis, LLP

(57) ABSTRACT

A processing device comprises a processor coupled to a memory and is configured to obtain data relating to communications initiated by host devices of a computer network of an enterprise, and to process the data to identify external domains contacted by the host devices. A graph inference algorithm is applied to analyze contacts of the host devices with the external domains in order to characterize one or more of the external domains as suspicious domains. The host devices are configured to counteract malware infection from the suspicious domains. The graph inference algorithm in some embodiments comprises a belief propagation algorithm, which may be initiated with one or more seeds corresponding to respective known suspicious domains or to respective ones of the external domains determined to be associated with command and control behavior. The processing device may be implemented in the computer network or an associated network security system.

22 Claims, 5 Drawing Sheets

(56) References Cited

U.S. PATENT DOCUMENTS

| | | | |
|---|---|---|---|
| 8,661,544 B2 | 2/2014 | Yen et al. | |
| 8,776,168 B1 | 7/2014 | Gibson et al. | |
| 8,782,782 B1 | 7/2014 | Dicovitsky et al. | |
| 2009/0328209 A1 | 12/2009 | Nachenberg | |
| 2010/0125911 A1 | 5/2010 | Bhaskaran | |
| 2010/0235915 A1 | 9/2010 | Memon et al. | |
| 2011/0302656 A1* | 12/2011 | El-Moussa | H04L 63/1425 726/24 |
| 2012/0084860 A1* | 4/2012 | Cao | H04L 63/1441 726/23 |
| 2012/0185945 A1 | 7/2012 | Andres et al. | |

OTHER PUBLICATIONS

RSA Security Analytics, "Detect & Investigate Threats." Data Sheet, Oct. 2013, 6 pages.

W. Xu et al., "New Trends in FastFlux Networks," https://media.blackhat.com/us-13/US-13-Xu-New-Trends-in-FastFlux-Net-works-WP.pdf, 2013, 5 pages.

T. Holz et al., "Measuring and Detecting Fast-Flux Service Networks," Proceedings of the Network and Distributed System Security Symposium (NDSS), Feb. 2008, 12 pages.

R. Perdisci et al., "Detecting Malicious Flux Service Networks Through Passive Analysis of Recursive DNS Traces," Annual Computer Security Applications Conference (ACSAC), Dec. 2009, pp. 311-320.

R. Perdisci et al., "Early Detection of Malicious Flux Networks Via Large-Scale Passive DNS Traffic Analysis," IEEE Transactions on Dependable & Secure Computing, Sep. 2012, pp. 714-726, vol. 9, No. 5.

Wikipedia, "Reserved IP Addresses," http://en.wikipedia.org/wiki/Reserved_IP_addresses, Jul. 2014, 5 pages.

T.-F. Yen et al., "An Epidemiological Study of Malware Encounters in a Large Enterprise," 21st ACM Conference on Computer and Communications Security (CCS), Nov. 3-7, 2014, 14 pages.

C. Gates et al., "Scan Detection on Very Large Networks Using Logistic Regression Modeling," Proceedings of the 11th IEEE Symposium on Computers and Communications (ISCC), Jun. 2006, pp. 402-408, Cagliari, Italy.

J.Y.J. Pan, "Fighting Fire with Fire—a Pre-Emptive Approach to Restore Control Over IT Assets from Malware Infection," Murdoch University, Thesis, Nov. 2012, 264 pages.

Y. Wang, "A Multinomial Logistic Regression Modeling Approach for Anomaly Intrusion Detection," Computers and Security, Nov. 2005, pp. 662-674, vol. 24, No. 8.

Merriam-Webster, "Epidemiology," m-w.com, May 2014, 6 pages.

J. Caballero et al., "Measuring Pay-Per-Install: The Commoditization of Malware Distribution," Proceedings of the 20th USENIX Security Symposium, Aug. 2011, pp. 187-202.

D. Canali et al., "On the Effectiveness of Risk Prediction Based on Users Browsing Behavior," Proceedings of the 9th ACM Symposium on Information, Computer and Communications Security, Jun. 2014, pp. 171-182.

Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.

M.P. Collins et al., "Using Uncleanliness to Predict Future Botnet Addresses," Proceedings of the 7th ACM SIGCOMM Conference on Internet Measurement, Oct. 2007, pp. 93-104.

D.J. Daley et al., "Epidemic Modelling: An Introduction," American Journal of Epidemiology, 2000, pp. 835-836, vol. 151, No. 8.

A. Kleiner et al., "Linking Cybersecurity Policy and Performance," Microsoft Trustworthy Computing, 2013, 27 pages.

M.W. Kreuter et al., "Tailored and Targeted Health Communication: Strategies for Enhancing Information Relevance," American Journal of Health Behavior, Nov.-Dec. 2003, pp. S227-S232, vol. 27, No. 3.

M. Lee, "Who's Next? Identifying Risk Factors for Subjects of Targeted Attacks," 22nd Virus Bulletin International Conference, Sep. 2012, pp. 301-306.

F. L. Lévesque et al., "A Clinical Study of Risk Factors Related to Malware Infections," Proceedings of the ACM SIGSAC Conference on Computer and Communications Security, Nov. 2013, pp. 97-108.

G. Maier et al., "An Assessment of Overt Malicious Activity Manifest in Residential Networks," Proceedings of the 8th International Conference on Detection of Intrusions and Malware, and Vulnerability Assessment (DIMVA), Lecture Notes in Computer Science, Jul. 2011, pp. 144-163, vol. 6739, Amsterdam, The Netherlands.

Microsoft, "Microsoft Security Intelligence Report," Jan.-Jun. 2011, 168 pages, vol. 11.

Microsoft, "Microsoft Security Intelligence Report," Jul.-Dec. 2011, 138 pages, vol. 12.

Microsoft, "Microsoft Security Intelligence Report," Jan.-Jun. 2013, 160 pages, vol. 15.

Microsoft, "Microsoft Security Intelligence Report," Jul.-Dec. 2013, 152 pages, vol. 16.

G.R. Milne et al., "Toward an Understanding of the Online Consumer's Risky Behavior and Protection Practices," The Journal of Consumer Affairs, Sep. 2009, pp. 449-473, vol. 43, No. 3.

F.T. Ngo et al., "Cybercrime Victimization: An Examination of Individual and Situational Level Factors," International Journal of Cyber Criminology, Jan.-Jul. 2011, pp. 773-793, vol. 5, No. 1.

K. Onarlioglu et al., "Insights into User Behavior in Dealing with Internet Attacks," 19th Annual Network and Distributed System Security Symposium (NDSS), Feb. 2012, 14 pages.

A. Ramachandran et al., "Understanding the Network-Level Behavior of Spammers," ACM SIGCOMM Computer Communication Review, Sep. 2006, pp. 291-302, vol. 36, No. 4, Pisa, Italy.

S. Sheng et al., "Who Falls for Phish? A Demographic Analysis of Phishing Susceptibility and Effectiveness of Interventions," Proceedings of the SIGCHI Conference on Human Factors in Computing Systems, Apr. 2010, pp. 373-382.

D. Sounthiraraj et al., "SMV-HUNTER: Large Scale, Automated Detection of SSL/TLS Man-in-the-Middle Vulnerabilities in Android Apps," Network and Distributed System Security Symposium (NDSS), Feb. 2014, 14 pages.

Symantec Corporation, "Internet Security Threat Report," http://www.symantec.com/content/en/us/enterprise/other_resources/b-istr_appendices_v18_2012_221284438.en-us.pdf, Apr. 2013, 96 pages, vol. 18.

Y. Xie et al., "Spamming Botnets: Signatures and Characteristics," Proceedings of the ACM SIGCOMM Conference on Data Communication, Aug. 2008, pp. 171-182.

J. Zhang et al., "On the Mismanagement and Maliciousness of Networks," Proceedings of the 21st Annual Network & Distributed System Security Symposium (NDSS), Feb. 2014, 12 pages.

M. Nicolett et al., "Magic Quadrant for Security Information and Event Management," Gartner Research Note G00212454, May 2011, 32 pages.

RSA, "Stalking the Kill Chain," http://www.emc.com/collateral/hardware/solution-overview/h11154-stalking-the-kill-chain-so.pdf, 2012.

Nicole Perlroth, "Hackers in China Attacked the Times for Last 4 Months," The New York Times, http://www.nytimes.com/2013/01/31/technology/chinese-hackers-infiltrate-new-york-times-computers.html, Jan. 30, 2013, 8 pages.

Tal Beery, "Target's Data Breach: The Commercialization of APT," SecurityWeek.com, http://www.securityweek.com/targets-data-breach-commercialization-apt, Mar. 19, 2014, 8 pages.

Verizon, "2014 Data Breach Investigations Report," http://www.verizonenterprise.com/DBIR/2014/, 2014, 60 pages.

M. Antonakakis et al., "Building a Dynamic Reputation System for DNS," Proceedings of the 19th USENIX Conference on Security Symposium (SS), Aug. 2010, pp. 273-290.

M. Antonakakis et al., "Detecting Malware Domains at the Upper DNS Hierarchy," Proceedings of the 20th USENIX Security Symposium (SS), Aug. 2011, 16 pages, vol. 11.

(56) References Cited

OTHER PUBLICATIONS

M. Antonakakis et al., "From Throw-Away Traffic to Bots: Detecting the Rise of DGA-Based Malware," Proceedings of the 21st USENIX Conference on Security Symposium (SS), Aug. 2012, pp. 491-506.

L. Bilge et al., "Disclosure: Detecting Botnet Command and Control Servers Through Large-Scale NetFlow Analysis," Proceedings of the 28th Annual Computer Security Applications Conference (ACSAC), Dec. 2012, pp. 129-138.

L. Bilge et al., "Exposure: Finding Malicious Domains Using Passive DNS Analysis," Proceedings of the 18th Symposium on Network and Distributed System Security (NDSS), Feb. 2011, 17 pages.

Command Five Pty Ltd, "Command and Control in the Fifth Domain," http:www.commandfive.com/papers/C5_APT_C2InTheFifthDomain.pdf, Feb. 2012, 29 pages.

Silas Cutler, "The Mirage Campaign," Dell Secure Works, http://www.secureworks.com/cyber-threat-intelligence/threats/the-mirage-campaign/, Sep. 18, 2012, 7 pages.

Dell Secureworks Counter Threat Unit(TM) Threat Intelligence, "Top Banking Botnets of 2013," http://www.secureworks.com/cyber-threat-intelligence/threats/top-banking-botnets-of-2013/, Mar. 3, 2014, 10 pages.

N. Falliere et al., "W32.Stuxnet Dossier," Version 1.4, Symantec Security Response, http://www.symantec.com/security_response/whitepapers.jsp, Feb. 2011, 69 pages.

Paul S. Ferrell, APT Infection Discovery Using DNS Data, Los Alamos National Laboratory (LANL), Report No. LA-UR-13-23109, http://permalink.lanl.gov/object/tr?what=info:lanl-repo/lareport/LA-UR-13-23109, Apr. 30, 2013, 5 pages.

C. Grier et al., "Manufacturing Compromise: the Emergence of Exploit-as-a-Service," Proceedings of the ACM Conference on Computer and Communications Security (CCS), Oct. 2012, pp. 821-832.

G. Gu et al., "BotMiner: Clustering Analysis of Network Traffic for Protocol- and Structure-Independent Botnet Detection," Proceedings of the 17th USENIX Security Symposium (SS), Jul. 2008, pp. 139-154, vol. 5, No. 2.

G. Gu et al., "BotHunter: Detecting Malware Infection Through IDS-Driven Dialog Correlation," Proceedings of the 16th USENIX Security Symposium (SS), Article No. 12, Aug. 2007, pp. 167-182, vol. 7.

G. Gu et al., "BotSniffer: Detecting Botnet Command and Control Channels in Network Traffic," Proceedings of the 16th Annual Network and Distributed System Security Symposium (NDSS), Feb. 2008, 18 pages.

S. Hao et al., "Monitoring the Initial DNS Behavior of Malicious Domains," Proceedings of the ACM SIGCOMM Conference on Internet Measurement Conference (IMC), Nov. 2011, pp. 269-278, Berlin, Germany.

Hon Lau, "The Truth Behind the Shady RAT," Symantec Connect Community, http://www.symantec.com/connect/blogs/truth-behind-shady-rat, Aug. 4, 2011, 9 pages.

L. Invernizzi et al., "Nazca: Detecting Malware Distribution in Large-Scale Networks," Proceedings of the ISOC Network and Distributed System Security Symposium (NDSS), Feb. 2014, 16 pages.

G. Jacob et al., "JackStraws: Picking Command and Control Connections from Bot Traffic," Proceedings of the 20th USENIX Conference on Security Symposium (SS), Aug. 2011, 16 pages.

James Wyke, "ZeroAccess," SophoLabs UK, http://nakedsecurity.sophos.com/zeroaccess/, 2012, 23 pages.

S. Le Blond et al., "A Look at Targeted Attacks Through the Lense of an NGO," Proceedings of the 23rd USENIX Security Symposium (SS), Aug. 2014, pp. 543-558.

J. Ma et al., "Beyond Blacklists: Learning to Detect Malicious Web Sites from Suspicious URLs," Proceedings of the 15th ACM SIGKDD International Conference on Knowledge Discovery and Data Mining (KDD), Jun.-Jul. 2009, pp. 1245-1254, Paris, France.

Mandiant, "APT1: Exposing One of China's Cyber Espionage Units," Council on Foreign Relations, http://www.mandiant.com, Feb. 2013, 76 pages.

W.R. Marczak et al., "When Governments Hack Opponents: A Look at Actors and Technology," Proceedings of the 23rd USENIX Security Symposium (SS), Aug. 2014, pp. 511-525.

T. Nelms et al., "ExecScent: Mining for New C&C Domains in Live Networks with Adaptive Control Protocol Templates," Proceedings of the 22nd USENIX Security Symposium (SS), 2013, pp. 589-604.

Marta López, "Annual Report PandaLabs—2013 Summary," Panda Security, http://press.pandasecurity.com/wp-content/uploads/2010/05/PandaLabs-Annual-Report_2013.pdf, Apr. 7, 2014, 6 pages.

V. Paxson et al., "Practical Comprehensive Bounds on Surreptitious Communication Over DNS," Proceedings of the 22nd USENIX Security Symposium (SS), Aug. 2013, pp. 17-32.

Judea Pearl, "Reverend Bayes on Inference Engines: A Distributed Hierarchical Approach," Proceedings of the Second National Conference on Artificial Intelligence (AAAI-82), Aug. 1982, pp. 133-136.

M.A. Rajab et al., "CAMP: Content-Agnostic Malware Protection," Proceedings of the ISOC Network and Distributed System Security Symposium (NDSS), Feb. 2013, 15 pages.

U. Rivner, "Anatomy of an Attack," RSA, http://blogs.rsa.com/rivner/anatomy-of-an-attack/, Apr. 1, 2011, 7 pages.

Y. Rubner et al., "The Earth Mover's Distance as a Metric for Image Retrieval," International Journal of Computer Vision, Nov. 2000, pp. 99-121, vol. 40, No. 2.

G. Stringhini et al., "Shady Paths: Leveraging Surfing Crowds to Detect Malicious Web Pages," Proceedings of the ACM SIGSAC Conference on Computer and Communications Security (CCS), Nov. 2013, pp. 133-144, Berlin, Germany.

F. Tegeler et al., "BotFinder: Finding Bots in Network Traffic Without Deep Packet Inspection," Proceedings of the 8th International Conference on Emerging Networking Experiments and Technologies (CoNEXT), Dec. 2012, pp. 349-360, Nice, France.

Websense Security Labs, "WebSense 2014 Threat Report," http://www.websense.com/assets/reports/report-2014-threat-report-en.pdf, Mar. 2014, 25 pages.

T.-F. Yen et al., "Beehive: Large-Scale Log Analysis for Detecting Suspicious Activity in Enterprise Networks," Proceedings of the 29th Annual Computer Security Applications Conference (ACSAC), Dec. 2013, pp. 199-208.

T.-F. Yen et al., "Traffic Aggregation for Malware Detection," Proceedings of the 5th International Conference on Detection of Intrusions and Malware, and Vulnerability Assessment (DIMVA), Lecture Notes in Computer Science (LNCS), Jul. 2008, pp. 207-227, vol. 5137.

E.M. Hutchins et al., "Intelligence-Driven Computer Network Defense Informed by Analysis of Adversary Campaigns and Intrusion Kill Chains," Proceedings of the 6th International Conference on Information Warfare and Security (ICIW), Mar. 2011, 14 pages.

Z. Li et al., "Hunting the Red Fox Online: Understanding and Detection of Mass Redirect-Script Injections," Proceedings of the IEEE Symposium on Security and Privacy (SP), May 2014, pp. 3-18.

R. Perdisci et al., "Behavioral Clustering of HTTP-Based Malware and Signature Generation Using Malicious Network Traces," Proceedings of the 7th USENIX Conference on Networked Systems Design and Implementation (NSDI), Apr. 2010, pp. 391-404.

K.M. Carter et al., "Probabilistic Threat Propagation for Network Security," IEEE Transactions on Information Forensics and Security, Sep. 2014, pp. 1394-1405, vol. 9, No. 9.

O. Thonnard et al., "Industrial Espionage and Targeted Attacks: Understanding the Characteristics of an Escalating Threat," Proceedings of the 15th International Conference on Research in Attacks, Intrusions, and Defenses (RAID), Jan. 2012, pp. 64-85.

R Project, "The R Project for Statistical Computing," http://www.r-project.org/, 2015, 2 pages.

C.-M. Chen et al., "Detecting Hybrid Botnets with Web Command and Control Servers or Fast Flux Domain," Journal of Information Hiding and Multimedia Signal Processing, Apr. 2014, pp. 263-274, vol. 5, No. 2.

(56) References Cited

OTHER PUBLICATIONS

C.-M. Chen et al., "Detection of Fast-Flux Domains," Journal of Advances in Computer Networks, Jun. 2013, pp. 148-152, vol. 1, No. 2.

L. Bilge et al., "Exposure: a Passive DNS Analysis Service to Detect and Report Malicious Domains," ACM Transactions on Information and System Security (TISSEC), Article No. 14, Apr. 2014, pp. 1-28, vol. 16, No. 4.

E. Passerini et al., "FluXOR: Detecting and Monitoring Fast-Flux Service Networks," 5th International Conference on Detection of Intrusions and Malware, and Vulnerability Assessment (DIMVA), Jul. 2008, pp. 186-206, Paris, France.

A. Caglayan et al., "Real-Time Detection of Fast Flux Service Networks," Cybersecurity Applications & Technology Conference for Homeland Security (CATCH), Mar. 2009, pp. 285-292.

S. Martinez-Bea et al., "Real-Time Malicious Fast-Flux Detection Using DNS and Bot Related Features," 11th Annual International Conference on Privacy, Security and Trust (PST), Jul. 2013, pp. 369-372, Tarragona, Catalonia, Spain.

\* cited by examiner

FIG. 5

```
ALGORITHM 1 [BELIEF PROPAGATION]

/* H ← set of seed hosts */
/* M ← set of seed domains */
/* dom_host is a mapping from a domain to set of hosts contacting it */
/* host_rdom is a mapping from a host to set of rare domains visited */
function BELIEF_PROPAGATION(H, M):
    R ← set of rare domains contacted by hosts in H
    while stop_condition do
        N ← Φ      /* set of newly labeled malicious domains */
        for dom in R\M do
            if Detect_C&C(dom) then
                N ← N ∪ {dom}
                R ← R\ {dom}
        if N = Φ then
            for dom in R\M do
                score[dom] ← Compute_SimScore(dom)
            max_score ← max[score[dom]]
            max_dom ← dom of maximum score
            if max_score ≥ $T_s$ then
                N ← N ∪ {max_dom}
        if N ≠ Φ then
            M ← M ∪ N
            H ← H ∪ (∪$_{d∈N}$ dom_host[d])
            R ← R ∪ (∪$_{h∈H}$ host_rdom[h])
```

DETECTION OF SUSPICIOUS DOMAINS THROUGH GRAPH INFERENCE ALGORITHM PROCESSING OF HOST-DOMAIN CONTACTS

PRIORITY CLAIM

This application claims priority to U.S. Provisional Patent Application Ser. No. 61/991,123, filed May 9, 2014 and entitled "APT Detection by Mining Large-Scale Log Data," which is incorporated by reference herein in its entirety.

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, deployment of malware that is utilized by attackers to create networks of compromised computers or "botnets."

Network security systems can be designed to protect a computer network of a company, organization or other large enterprise comprising many thousands of host devices, also referred to herein as simply "hosts." However, enterprise computer networks are in many cases continuously growing in size, and often incorporate a diverse array of host devices, including mobile telephones, laptop computers and tablet computers. This continuous growth can make it increasingly difficult to provide a desired level of protection using the limited resources of the network security system. For example, available network security system functionality such as processing of security alerts and deployment of memory analysis tools on host devices can be strained by the demands of large enterprise networks.

Moreover, recent years have seen the rise of increasingly sophisticated malware attacks including advanced persistent threats (APTs) which pose severe risks to enterprises. These APTs are typically orchestrated by well-funded attackers using advanced tools to adapt to the victim environment while maintaining low profiles of activity. Additionally, new malware strains appear at a higher rate than ever before. Since many of these different types of malware are configured to evade existing security products, traditional defenses deployed by enterprises today often fail at detecting infections at a sufficiently early stage.

SUMMARY

Illustrative embodiments of the invention provide techniques for detection of suspicious domains through graph inference algorithm processing of host-domain contacts. Such an arrangement in some embodiments advantageously permits a network security system to focus its efforts on the particular ones of its host devices that have been exposed to the detected suspicious domains.

Accordingly, the limited resources of the network security system available for malware infection remediation can be more intelligently and effectively deployed in the computer network, resulting in improved performance as well as enhanced security against both APTs and new malware strains.

In one embodiment, a processing device comprises a processor coupled to a memory and is configured to obtain data relating to communications initiated by host devices of a computer network of an enterprise, and to process the data to identify external domains contacted by the host devices in conjunction with the communications. A graph inference algorithm is applied to analyze contacts of the host devices with the external domains in order to characterize one or more of the external domains as suspicious domains. One or more of the host devices are configured to counteract malware infection from the suspicious domains.

The graph inference algorithm in some embodiments comprises a belief propagation algorithm. The belief propagation algorithm may be initiated with one or more seeds corresponding to respective known suspicious domains or to respective ones of the external domains determined to be associated with command and control behavior.

A given processing device configured with functionality for detection of suspicious domains using graph inference algorithm processing of host-domain contacts may be implemented, for example, in one or more network devices of a computer network, or in a security analytics system or other type of network security system associated with the computer network.

These and other illustrative embodiments include, without limitation, methods, apparatus, networks, systems and processor-readable storage media.

BRIEF DESCRIPTION OF THE DRAWINGS

FIG. 5 shows pseudocode of an example of a belief propagation algorithm that is utilized as a graph inference algorithm for suspicious domain detection in one or more embodiments.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
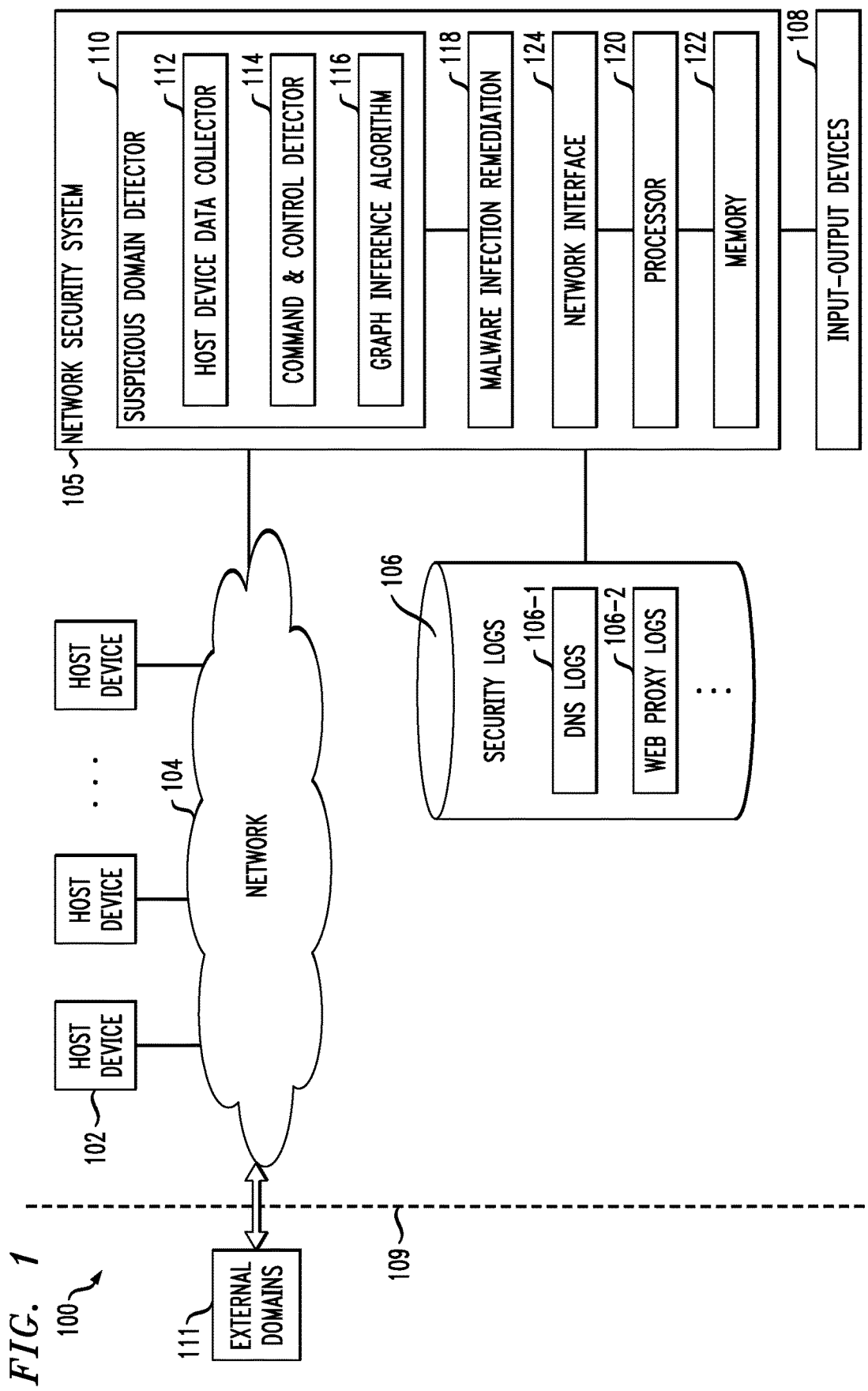
FIG. 1 shows a computer network configured to detect suspicious domains through graph inference algorithm processing of host-domain contacts in an illustrative embodiment of the invention.

FIG. 1 shows a computer network 100 configured in accordance with an illustrative embodiment of the invention. The computer network 100 comprises a plurality of host devices 102. The host devices are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The host devices 102 may comprise, for example, client devices, web servers, network appliances or other types of devices, in any combination. Such devices are examples of what are more generally referred to herein as "processing devices."

It is further assumed that the host devices 102 comprise respective computers associated with a particular company, organization or other enterprise. The host devices 102 are therefore also referred to herein as "enterprise hosts" or simply as "hosts." In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 104 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising network devices configured to communicate using IP or other related communication protocols.

The network security system 105 has an associated database 106 configured to store security logs. The security logs database 106 more particularly stores security logs such as domain name service (DNS) logs 106-1 and web proxy logs 106-2, although additional or alternative logs may be used in other embodiments, including virtual private network (VPN) logs and anti-virus logs. The security logs database 106 in the present embodiment is implemented using one or more storage devices associated with the network security system 105. Such storage devices may comprise, for example, storage products such as VNX® and Symmetrix VMAX®, both commercially available from EMC Corporation of Hopkinton, Mass. A variety of other storage products may be utilized to implement at least a portion of the storage devices associated with the network security system 105.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

The network security system 105 further comprises a suspicious domain detector 110. The suspicious domain detector 110 is configured to obtain data relating to communications initiated by the host devices 102 and to process the data to identify particular ones of a plurality of external domains 111 that are contacted by the host devices 102 in conjunction with those communications. The external domains 111 are separated from portions of computer network 100 within the enterprise by at least one firewall 109.

The suspicious domain detector 110 further comprises a command and control detector 114 that is configured to identify among the communications between the host devices 102 and the external domains 111 the presence of command and control communications associated with malware infection.

The particular ones of the external domains 111 are identified in association with particular ones of the host devices 102 that have contacted those domains. This results in a set of host-domain contacts that are further processed using a graph inference algorithm 116. The graph inference algorithm 116 is illustratively applied to analyze the contacts between the host devices 102 and the external domains 111 in order to characterize one or more of the external domains as suspicious domains.

By way of example, the graph inference algorithm 116 in the present embodiment is assumed to more particularly comprise a belief propagation algorithm, with the belief propagation algorithm being configured to process the host-domain contacts in order to identify particular ones of the external domains 111 that are associated with a common attack campaign against the enterprise that includes the host devices 102. The resulting identified external domains are examples of what are more generally referred to herein as "suspicious domains."

In some embodiments, the belief propagation algorithm models contacts of the host devices with the external domains using a bipartite graph structure. The bipartite graph structure illustratively comprises host device vertices corresponding to respective ones of the plurality of host devices 102, external domain vertices corresponding to respective ones of the external domains 111, and edges connecting particular ones of the host device vertices with particular ones of the external domain vertices. A given one of the edges connects a given host device vertex to a given external domain vertex if the corresponding host device has contacted the corresponding external domain at least once during a specified observation window.

It is to be appreciated, however, that any of a number of other graph structures can be used to implement a belief propagation algorithm in other embodiments. Also, other embodiments can use alternative graph inference algorithms in place of or in addition to a belief propagation algorithm.

The network security system 105 further comprises a malware infection remediation module 118. This module is utilized to configure one or more of the host devices 102 to counteract malware infection from the suspicious domains identified utilizing the graph inference algorithm 116.

Such an arrangement advantageously permits the network security system 105 to focus its efforts on the particular ones of the host devices 102 that have been exposed to the suspicious domains. Accordingly, the limited resources of the network security system 105 available for malware infection remediation can be more intelligently and effectively deployed in the computer network 100, leading to improved performance and enhanced security, particularly with regard to defending against APTs and new malware strains.

It is to be appreciated that this particular arrangement of modules illustrated in the FIG. 1 embodiment is presented by way of example only, and alternative arrangements can be used in other embodiments. For example, the functionality associated with the modules 110, 112, 114, 116 and 118 in other embodiments can be combined into a single module, or separated across a larger number of modules.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the host devices 102, and illustratively comprises one or more conventional transceivers.

At least portions of the suspicious domain detector 110, such as portions of one or more of host device data collector 112, command and control detector 114 and graph inference algorithm 116, and additionally or alternatively at least portions of the malware infection remediation module 118, may be implemented at least in part in the form of software that is stored in memory 122 and executed by processor 120.

It is to be understood that the particular set of elements shown in FIG. 1 for detecting suspicious domains among the external domains 111 and implementing malware infection remediation in host devices 102 of computer network 100 based on the detected suspicious domains is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and one or both of the suspicious domain detector 110 and malware infection remediation module 118 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated suspicious domain detector 110 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the security logs stored in the database 106 illustratively comprise security logs collected by the SIEM system.

An exemplary process utilizing suspicious domain detector 110 and malware infection remediation module 118 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 208. Steps 200, 202, 204 and 208 are assumed to be performed by the suspicious domain detector 110 in conjunction with detection of suspicious domains based on graph inference algorithm analysis of contacts between the host devices 102 and the external domains 111. Step 206 is an example of a malware infection remediation step assumed to be performed by the malware infection remediation module 118 of the network security system 105.

In step 200, data relating to communications initiated by host devices of a computer network of an enterprise is obtained. For example, at least a portion of the data can be obtained from security logs in the database 106. Such security logs may comprise, for example, DNS logs of the enterprise, web proxy logs of the enterprise or combinations of these and other types of information. Additionally or alternatively, in some embodiments full packet captures at the firewall 109 or other enterprise border may be utilized, possibly in combination with security logs such as DNS logs or web proxy logs.

In step 202, the data is processed to identify external domains contacted by the host devices in conjunction with the communications.

In step 204, a graph inference algorithm is applied to analyze contacts of the host devices with the external domains in order to characterize one or more of the external domains as suspicious domains.

As mentioned previously, the graph inference algorithm in some embodiments comprises a belief propagation algorithm that models contacts of the host devices 102 with the external domains 111 using a bipartite graph structure that includes host device vertices corresponding to respective ones of the plurality of host devices, external domain vertices corresponding to respective ones of the external domains, and edges connecting particular ones of the host device vertices with particular ones of the external domain vertices. A given one of the edges connects a given host device vertex to a given external domain vertex if the corresponding host device has contacted the corresponding external domain at least once during a specified observation window. The belief propagation algorithm in such an embodiment is illustratively configured to identify particular ones of the external domains 111 that are associated with a common attack campaign against the enterprise that includes the host devices 102.

The belief propagation algorithm is illustratively a type of graph inference algorithm that can be utilized to determine the label of a graph vertex given prior knowledge about the vertex itself and information about its neighbors in the graph structure. The algorithm may be based on iterative message-passing between a vertex and its neighbors until convergence or a specified stopping condition is achieved.

A more detailed example of the belief propagation algorithm will be described below in conjunction with FIG. 5. In this example, the belief propagation algorithm is configured to update a set of rare domains in each of a plurality of iterations. The set of rare domains comprises particular ones of the external domains 111 that are contacted on only a relatively infrequent basis within a specified observation window by only a relatively small subset of the plurality of host devices 102.

The belief propagation algorithm is configured in this embodiment for operation in multiple distinct modes. These modes illustratively include a hint mode in which the belief propagation algorithm is initiated with one or more seeds corresponding to respective known suspicious domains, and a no-hint mode in which the belief propagation algorithm is initiated without any seeds corresponding to respective known suspicious domains.

A given one of the seeds utilized to initiate the belief propagation algorithm in the hint mode may be provided, for example from an SOC of the enterprise based at least in part on a corresponding indicator of compromise (IOC).

In the no-hint mode, the belief propagation algorithm is initiated with one or more seeds corresponding to respective ones of the external domains determined to being associated with command and control behavior.

In a given one of the iterations of the belief propagation algorithm a score is generated for each of the domains in the set of rare domains based at least in part on one or more of a first set of features indicative of command and control behavior, and a second set of features indicative of similarity between the domain and one or more suspicious domains as determined in a previous iteration of the belief propagation algorithm. The first and second sets of features are illustratively weighted in accordance with weights determined by a linear regression model generated in a training phase.

The scores are utilized to characterize a subset of the set of rare domains as suspicious domains in the given iteration. For example, the belief propagation algorithm may be configured to return a list of suspicious domains ranked in order of their respective scores.

The belief propagation algorithm terminates responsive to at least one of a highest score among the scores of the suspicious domains being below a threshold, and a maximum number of iterations being reached.

In step 206, one or more of the host devices 102 are configured to counteract malware infection from the suspicious domains.

In step 208, the feature weights used to generate domain scores processed by the graph inference algorithm are updated. It is also possible that the model can be periodically updated to incorporate additional or alternative features. This allows the model to be "tuned" over time to the particular security conditions facing a particular enterprise.

Additional instances of steps 200 through 208 can be performed on a regular basis or otherwise repeated periodically in order to ensure that suspicious domains continue to be accurately identified and appropriate malware infection remediation actions taken in the presence of varying security threats.

Numerous other techniques can be used to detect suspicious domains based on graph inference algorithm processing of host-domain contacts.

Figure 2:
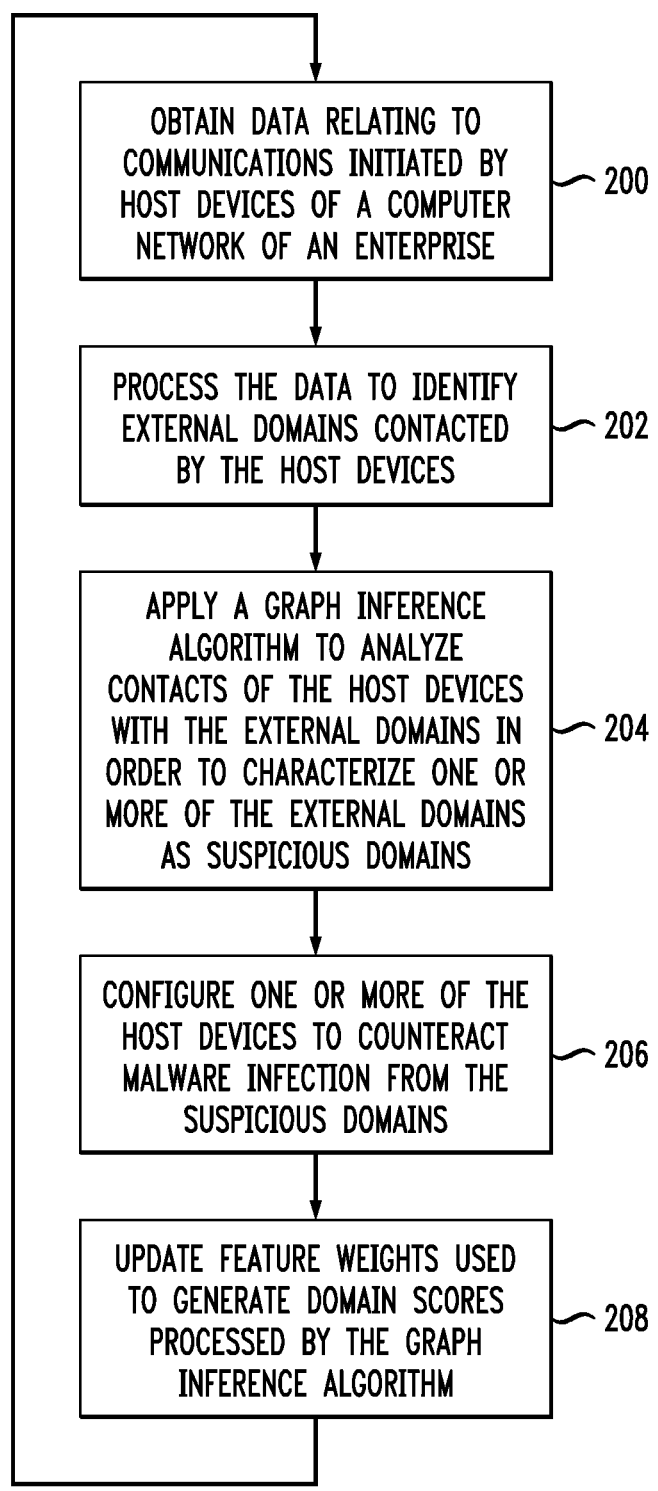
FIG. 2 is a flow diagram of a process for detecting suspicious domains through graph inference algorithm processing of host-domain contacts in an illustrative embodiment.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect suspicious domains and undertake appropriate malware infection remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of suspicious domain detection.

Additional examples of illustrative embodiments will now be described with reference to FIGS. 3, 4 and 5.

These embodiments are generally configured to detect early-stage malware infection within an enterprise based on communications to external domains initiated by internal host devices. As mentioned previously, such early-stage malware infections are often associated with APTs launched by sophisticated attackers.

Figure 3:
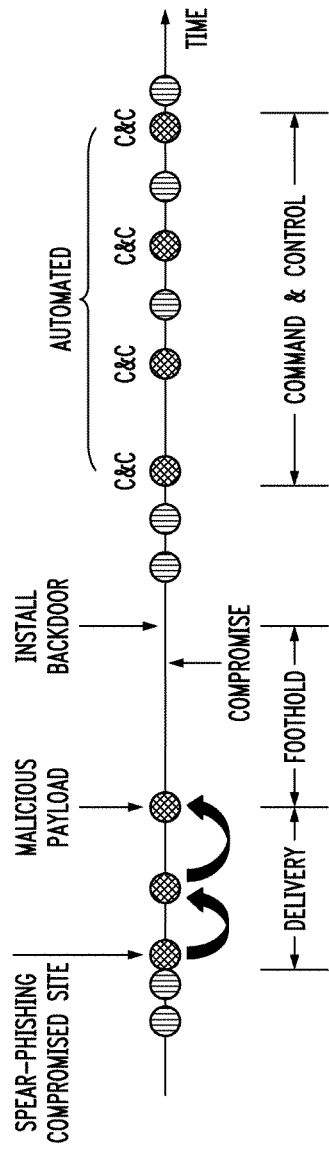
FIG. 3 shows an example of an APT scenario in an enterprise computer network that is effectively counteracted using suspicious domain detection techniques in an illustrative embodiment.

FIG. 3 shows an example of an APT scenario that can arise in the computer network 100 in an illustrative embodiment. One or more suspicious external domains associated with this type of scenario, as well as numerous other early-stage malware infection scenarios, can be accurately and efficiently detected using graph inference algorithm analysis of host-domain contacts as described herein.

In the FIG. 3 example, communications initiated by a given one of the host devices 102 with external domains 111 are shown as circles arranged sequentially along a time axis. The darker shaded circles represent respective communications associated with an early-stage malware infection of the given host device as deployed via one or more of the external domains 111. Some embodiments of the invention are configured to identify and process such communications in order to identify the one or more external domains that are "suspicious" or in this case responsible for at least a portion of the malware infection. The lighter shaded circles represent normal communications with legitimate ones of the external domains 111.

The APT scenario illustrated in FIG. 3 includes a number of distinct stages, including a delivery stage, a foothold establishment stage and a command and control stage. The delivery stage is assumed to be initiated by a spear-fishing email from a compromised site hosted by one of the external domains 111. Such an email can be addressed to many different users within the targeted enterprise and typically includes a malicious attachment or a hyperlink to a malicious file. A wide variety of other techniques can be utilized to initiate similar APT scenarios detectable in illustrative embodiments, including distribution of malicious USB drives as well as web-based attacks including drive-by-download, clickjacking and malvertising.

The victim host device in the delivery stage visits several malicious domains within a relatively short time interval as a result of redirection techniques employed by attackers. The delivery stage ends with delivery of a malicious payload to the host machine from one of the malicious domains.

It should be noted in this regard that a "malicious domain" is assumed to be one actually associated with an APT, malware delivery or other type of attack. Domains referred to herein as "suspicious domains" are suspected of being malicious domains, but it is possible that a relatively small percentage of domains identified as being suspicious using some embodiments disclosed herein may not actually be malicious domains. Such domains are associated with what are referred to as "false positives" in those embodiments.

Accordingly, a given set of "suspicious domains" as used that term is broadly used herein may primarily include malicious domains possibly in combination with one or more domains that are not actually malicious but instead represent false positives of a given suspicious domain detection process.

Referring again to the APT scenario of FIG. 3, in some cases, the initial malicious payload provided in the delivery stage is generic in that, for example, it may be configured simply to perform system reconnaissance. Additional malware specifically crafted for the victim environment is then delivered later.

After the delivery stage, the foothold establishment stage includes compromise of the victim host device and installation of a "backdoor" in that host device.

The backdoor installed in the victim host device during the foothold establishment stage initiates automated command and control (C&C) communications from the host device. The C&C communications occurs at fairly regular time intervals (e.g., minutes or hours) with small amounts of randomization. These communications provide regular connection to C&C servers operated by an attacker, and can evade firewalls that block connections from outside the network. For example, the C&C communications are often configured to utilize HTTP or HTTPs ports since these ports are allowed by most enterprise firewalls.

It is to be appreciated that the particular APT scenario illustrated in FIG. 3 is presented by way of example only, and numerous alternative APT scenarios or other types of malware attacks involving suspicious domains can be detected in embodiments of the invention. Accordingly, the particular features and characteristics of the FIG. 3 scenario should not be construed as limiting in any way.

In APT scenarios such as that illustrated in FIG. 3, attackers tend to use domains under their control for different stages of the campaign, such as delivery and C&C. Generally, these attacker-controlled domains are uncommon destinations for the host devices of the enterprise, with relatively low volumes of traffic directed to them globally. Additionally, attackers tend to more frequently use domain names rather than direct IP connections for their C&C communication so that they can dynamically flux the domains.

As mentioned previously, a compromised host device usually contacts several malicious domains within a relatively short time interval. For instance, a user clicking on an embedded link in an email might visit the front-end attacker site, get redirected to a site hosting a malicious payload and shortly after the backdoor is established will initiate the first connection to the C&C server. These domains form small communities exhibiting similarity in connection timing, sets of host devices contacting them if multiple hosts are infected in the same campaign, and possibly also proximity in IP address space. Moreover, attackers tend to reuse code and successful infiltration techniques across different campaigns.

Some embodiments of the invention are configured to leverage these and other features of APT scenarios in detecting suspicious domains using graph inference algorithm analysis of host-domain contacts.

For example, in some embodiments in which the graph inference algorithm is implemented as a belief propagation algorithm, the belief propagation algorithm is initiated using seeds corresponding to respective known suspicious domains or domains associated with detected C&C communications. Such an approach leverages relationships among domains contacted in multiple stages of the infection process and utilizes a combination of both unsupervised and supervised learning techniques.

Figure 4:
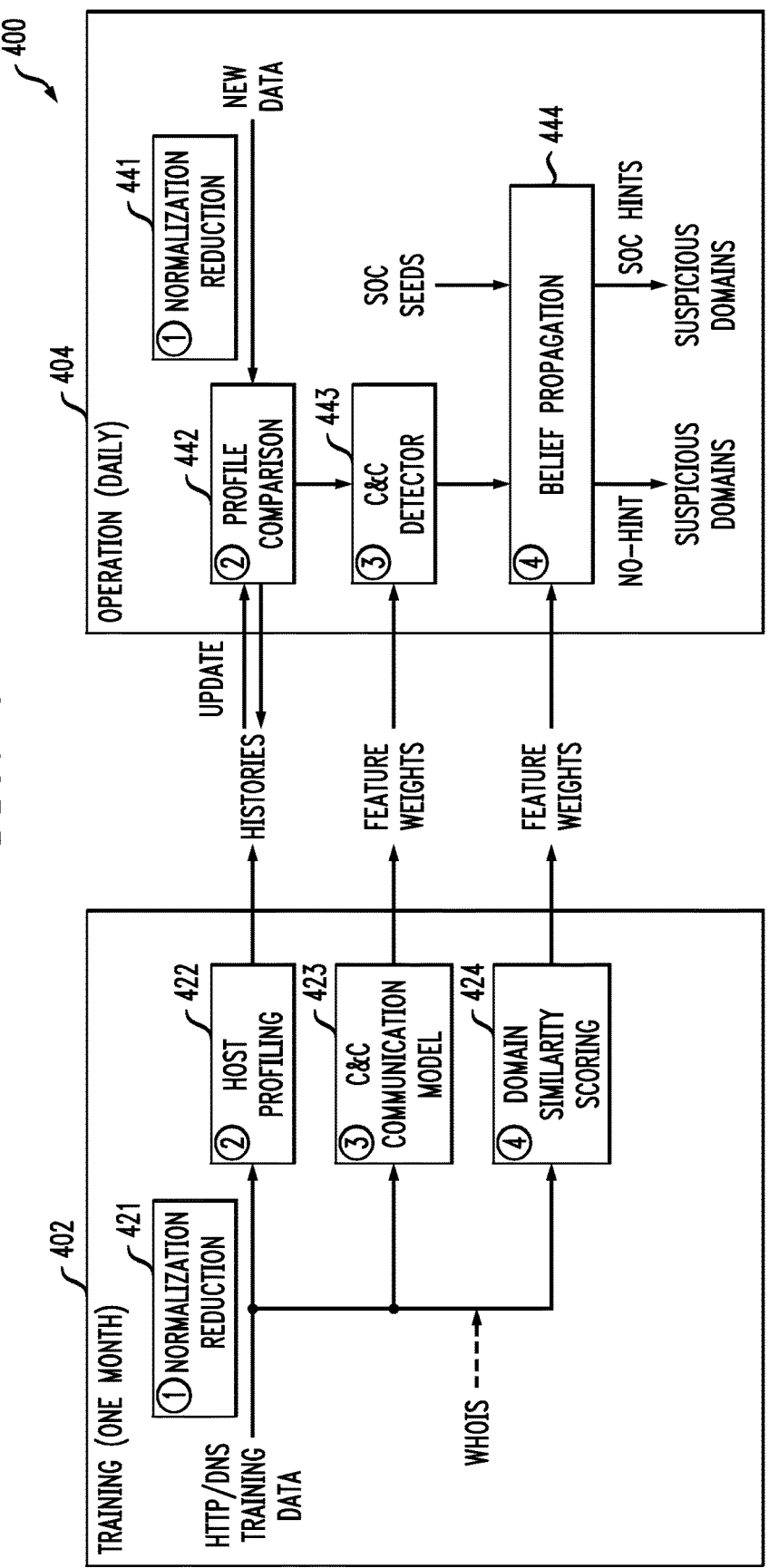
FIG. 4 is a block diagram illustrating training and operation portions of suspicious domain detection in an illustrative embodiment.

FIG. 4 illustrates training and operation portions of suspicious domain detection in an illustrative embodiment that utilizes a belief propagation algorithm. In this embodiment, a network security system 400 implements a training phase 402 and an operation phase 404. The training phase is illustratively performed using security logs or other data captured for over a one-month period, and the operation phase is performed much more frequently, and more particularly on a daily basis after completion of the initial one-month training period. It is to be understood, however, that different periods for training and operation phases can be used in other embodiments.

In this embodiment, the network security system 400 is configured to detect communities of suspicious domains with similar features that are likely part of the same campaign. The belief propagation algorithm may be initiated in the above-noted hint mode using seeds corresponding to known suspicious domains. The host devices that have initiated communications with those domains are considered known compromised hosts. The known suspicious domains are assumed in the FIG. 4 embodiment to be determined at least in part using information provided by an SOC of the enterprise, and in such an arrangement the hints are more particularly referred to as SOC hints. This mode automatically captures relationships between domains used by attackers in different stages of a campaign.

As mentioned previously, it is also possible for the belief propagation algorithm to operate in a no-hint mode which does not utilize any seeds corresponding to respective known suspicious domains.

Such a mode of operation, as well as other possible modes, can utilize detection of C&C communications as automated, high-frequency activities distinctive from human-generated behavior. The FIG. 4 embodiment utilizes a C&C detector in the operation phase 404 of the suspicious domain detection. The C&C detector is illustratively configured to utilize a combination of enterprise-specific and generic features.

The resulting detected domains exhibiting C&C-like behavior and the hosts contacting those domains can also be used as additional seeds for the belief propagation algorithm in the no-hint mode and possibly in other modes to identify related suspicious domains and corresponding compromised hosts.

The belief propagation algorithm iteratively computes scores for other ones of the external domains 111 based on the degree to which the domain exhibits C&C-like behavior as well as its similarity to labeled suspicious domains from previous iterations of the belief propagation algorithm. The final domain score for a given domain is more particularly computed as a weighted sum of features with the weights being determined through a supervised learning approach illustratively based on linear regression.

The domains exhibiting C&C-like behavior as detected using the C&C detector are also referred to herein as "potential C&C domains." Such domains may be viewed in some embodiments as a subset of what are referred to herein as "automated domains" analyzed by the C&C detector. It is to be appreciated, however, that the C&C detector is not limited to processing automated domains.

The belief propagation algorithm proceeds iteratively and builds the bipartite graph structure incrementally for efficiency reasons. In each iteration, the algorithm computes scores for those rare domains contacted by compromised hosts, and labels the domains with the highest scores as suspicious. These domains are added to the graph together with the set of hosts contacting them. The algorithm terminates when the score of the top-ranking domain is below a threshold, or when the maximum number of iterations is reached, and returns a list of labeled suspicious domains ordered by suspiciousness level.

During the training phase 402, a benchmark of normal activity for a particular enterprise is created. The training phase 402 illustratively includes the following steps:

(1) Data normalization and reduction 421. This involves processing training data comprising DNS logs and web proxy logs, and applying normalization and reduction techniques to such data.

(2) Host profiling 422. Starting from the normalized and reduced data, the system 400 profiles the activity of internal hosts. It builds histories of external destinations visited by internal hosts as well as user-agent (UA) strings used in HTTP requests, when available. These histories are maintained and incrementally updated during the operation phase 404 when new data is available.

(3) C&C communication modeling 423. The C&C detector is customized to the particular enterprise by building a model of C&C communications for that enterprise. The model is utilized to implement the corresponding C&C detector in the operation phase 404.

(4) Domain similarity scoring 424. The domain similarity score used during belief propagation is also customized to the enterprise during the training phase.

After the initial training phase 402, the system 400 enters into its daily operation phase 404. The operation phase 404 illustratively includes the following steps:

(1) Data normalization and reduction 441. The system performs normalization and reduction for new data comprising DNS logs and web proxy logs.

(2) Profile comparison 442. The new data is compared with historical profiles, and rare domains, as well as rare UAs (e.g., UAs used by a small number of hosts) are identified. Histories are updated with new data, to capture drift in normal behavior.

(3) C&C detector 443. The C&C detector is run daily, and scores of automated domains are computed with weights determined during the training phase 402. Automated domains with scores above a threshold are labeled as potential C&C domains.

(4) Belief propagation 444. The belief propagation algorithm is run in either of the two modes described above. The output is an ordered list of suspicious domains that can be subject to further processing in conjunction with malware infection remediation.

The DNS logs utilized in steps 421 and 441 of the FIG. 4 embodiment can include, for example, DNS queries initiated by internal hosts, responses from DNS servers, event timestamps, and IP addresses of the sources and destinations, collected over a designated period of time.

The data reduction techniques applied in these steps can involve, for example, restricting analysis only to records of queries to domain names and their responses (e.g., IP addresses), filtering out queries for internal resources of the enterprise, and filtering out queries initiated by mail servers.

The web proxy logs utilized in steps 421 and 441 can incorporate logs collected by web proxies that intercept HTTP/HTTPS communications at the border of the enterprise network. These logs can include the connection timestamp, IP addresses of the source and destination, full URL visited, and additional fields specific to HTTP communications (e.g., HTTP method, status code, UA string, web referrer, etc.). The web proxy logs can also include a list of domain IOCs used by the enterprise SOC.

In order to address inconsistencies due to multiple time zones of data collection devices and dynamic assignment of IP addresses, all timestamps can be converted into universal time code (UTC) and all IP addresses can be converted to hostnames (e.g., by parsing DHCP and VPN logs collected by the enterprise). After such conversions, the timestamp, hostname, destination domain, destination IP address, UA string, web referrer and HTTP status code fields are extracted for analysis.

In the FIG. 4 embodiment, the analysis focuses on rare domains identified in the data. The rare domains are generally identified as new domains (e.g., not visited before by any internal hosts) that are also unpopular (e.g., visited by a small number of internal hosts). A suitable threshold number of visiting hosts for considering a given new domain as a rare domain can be set to 10 hosts. Thus, a rare domain would be a new domain not visited by more than 10 hosts of the enterprise for the period in question.

In determining the rare domains, the training phase 402 uses the first month of data for profiling and to build a history of external destinations visited by internal hosts. As part of this process, the domain names are "folded" to second-level (e.g., news.nbc.com is folded to nbc.com), assuming that this captures the entity responsible for the domain. In the operation phase 404, the history of folded domain names queried by internal hosts is maintained, and updated at the end of each day to include all new domains from that day. A domain is considered new on a particular day if it is not already in the history and thus has not been visited by any of the internal hosts before that day.

FIG. 5 shows pseudocode of one possible example of a belief propagation algorithm that can be utilized in step 444 of the FIG. 4 embodiment as well as in other illustrative embodiments of the invention.

As noted above, the belief propagation algorithm in this embodiment is illustratively configured to detect communities of malicious domains that belong to the same attack campaign. The belief propagation algorithm can be applied in a hint more, a no-hint mode, and possibly in one or more additional or alternative modes. In the non-hint mode, the C&C detector 443 is run before the belief propagation algorithm in order to identify a set of potential C&C domains and the hosts contacting these domains. These identified potential C&C domains are provided as respective seeds to the belief propagation algorithm utilized in step 444.

Referring now to the pseudocode example of FIG. 5, a particular instance of belief propagation algorithm, denoted as Algorithm 1, starts from an initial set of compromised hosts H and an initial set of malicious domains M. The algorithm maintains several variables, including R which denotes the set of rare domains contacted by hosts in H, and N which denotes the set of newly-labeled suspicious domains in a particular iteration of the algorithm.

It should be noted that this pseudocode example refers to "malicious domains" rather than "suspicious domains." This is based on an assumption that the particular problematic domains identified by the belief propagation algorithm are actual malicious domains. In other embodiments, as explained elsewhere herein, a relatively small percentage of identified suspicious domains may turn out not to be malicious domains, as in the case of what are referred to as false positives.

In each iteration, the particular illustrative implementation of the belief propagation algorithm shown in the FIG. 5 pseudocode first detects potential C&C domains among set R using function Detect_C&C which will be described in more detail below. If no potential C&C domains are found, the algorithm computes a similarity score for all rare domains in R using function Compute_SimScore. The domain having the maximum score, if above a specified threshold $T_s$, is included in set M. Finally the set of compromised hosts is expanded to include other hosts contacting the newly labeled malicious domain(s). The algorithm iterates until the stopping condition is met in that either no new domains are labeled as malicious (due to their scores being below the threshold) or the maximum number of iterations has been reached. The output is expanded lists of compromised hosts H and malicious domains M.

The domain scores in some embodiments are assumed to be computed as weighted sums of features, where the weights are determined through supervised learning using linear regression. Thus, such embodiments combine a belief propagation algorithm, which is an example of unsupervised learning in the form of a type of graph inference algorithm, with supervised learning in the form of linear regression.

As mentioned previously, embodiments of the invention are not limited to use of belief propagation algorithms, and accordingly other types of graph inference algorithms can be used.

Also, other types of supervised learning can be used in generating the weights in other embodiments, including utilization of other models that estimate the probability of a domain being malicious. Such alternative models include, for example, logistic regression, random forest, naïve Bayes classifier, SVM, etc.

The C&C detector in the embodiments of FIGS. 4 and 5 is illustratively configured to detect automated connections with fairly regular timing patterns, but in a manner resilient to outliers (e.g., large gaps in communication) as well as randomization between connections. Accordingly, for every rare domain contacted by a host with a certain minimum frequency (e.g., 4 contacts) during a given observation window (e.g., daily), a histogram of inter-connection intervals is generated and compared to a periodic distribution.

In order to provide resiliency to bin alignment, a dynamic histogram is used in some embodiments. The dynamic histogram illustratively has a maximum bin width W and clusters the inter-connection intervals of successive connections from a host to a domain using a "greedy" approach. The bins are defined dynamically from the generated clusters. The resulting histogram is compared with that of a periodic distribution having period equal to the highest-frequency interval.

For comparing the two histograms, a Jeffrey divergence metric is utilized, as such a metric is considered numerically stable and robust to noise and bin size. Finally, the communications between a host and a domain are labeled as automated if the statistical distance between the two histograms is at most $J_T$. The bin width W and threshold $J_T$ control the resiliency of the method to outliers and randomization between connections.

For each rare domain determined to be an automated domain, a number of additional features are extracted for use by the C&C detector, including one or more of the following:

1. Domain connectivity features. These features include the number of hosts contacting the domain (NoHosts), also called domain connectivity, and the number of hosts with automated connections to the domain (AutoHosts). The intuition here is that most rare legitimate domains are contacted by only one host, but the probability of multiple hosts contacting a rare domain increases when the hosts are under the control of the same attacker.

2. Web connection features. Web connections with no referrer are more likely to indicate automated connections not initiated by a human user. To capture this, a feature NoRef is extracted denoting the fraction of hosts (among all hosts contacting that domain) that use no web referrer.

3. UA string features. A feature RareUA is extracted denoting the fraction of hosts that use no UA or a rare UA when contacting the domain. In a typical enterprise, it is expected that most UA strings are employed by a large population of users. With this intuition, the rare UA strings, those used by a small number of hosts, might indicate unpopular software installed on the host which can potentially be associated with suspicious activities. To determine the popularity of UA strings, a history of UAs encountered over time is maintained, as well the identities of the hosts using those UAs. This UA history is illustratively built during the training phase 402 for a period of one month and then updated daily in the operation phase 404 based on new data. A UA is considered rare (after the training period of one month) if it is used by less than a threshold number of hosts (e.g., 10).

4. Registration data features. Attacker-controlled sites tend to use more recently registered domains than legitimate sites. In addition, attackers register their domains for shorter periods of time to minimize their costs in case the campaign is detected and taken down. Accordingly, some embodiments query WHOIS information and extract two features relating to registration date, namely, DomAge (number of days since registration), and DomValidity (number of days until the registration expires).

In scoring the automated domains, the above-noted supervised learning approach based on a linear regression model is applied. More particularly, using the set of domains in the training data, a linear regression model is trained. The linear regression model may be implemented, for example, using the linear model (lm) function of the R statistical computing environment, described in "The R Project for Statistical Computing," www.r-project.org. The linear regression model outputs a weight for each feature, as well as the significance of that feature. The final score for each automated domain is a linear combination of feature values weighted by regression coefficients.

In a given simulation based on actual enterprise data, among all six features identified above, the only one with low significance was AutoHosts, which is highly correlated with NoHosts and therefore omitted from the model in an embodiment implementing the given simulation. The most relevant features found by the model in the given simulation are DomAge and RareUA. DomAge is the only one negatively correlated with reported domains (as they are in general more recently registered than legitimate ones), but all other features are positively correlated. Of course, the particular selected features can vary from embodiment to embodiment based on characteristics of the enterprise and other implementation-specific factors.

Based on the trained model, a threshold is selected for domain scores above which a domain is considered a potential C&C. Thus, the function Detect_C&C from Algorithm 1 is implemented as returning 1 if the domain score is above the threshold selected during training and 0 otherwise. The selection of feature weights and domain scoring threshold can be customized to each enterprise.

In order to detect infection patterns of the type shown in FIG. 3, a number of features are considered when computing similarity of a domain D with a set of domains S labeled malicious in previous iterations of the belief propagation algorithm of FIG. 5. These similarity features include one or more of the following:

1. Domain connectivity. The domain connectivity features as defined previously in the context of the C&C detector can also be utilized for domain similarity.

2. Timing correlations. Also considered are features related to the time when the domain D was visited by internal hosts. During an initial infection stage of a campaign, it is likely that a host visits several domains under the attacker's control within a relatively short time period, as explained previously. Accordingly, a possible timing correlation feature is the minimum timing difference between a host visit to domain D and other malicious domains in set S. The shorter this interval, the more suspicious the domain D.

3. IP space proximity. Other possible features relate to proximity in IP space between D and domains in set S. Proximity in the IP/24 and /16 subnets is denoted by IP24 and IP16, respectively. The intuition here is that attackers tend to host a large number of malicious domains under a small number of IP subnets.

The domain similarity score determined based on the features described above can be tailored to the particular enterprise during the training phase 402. For example, a list of non-automated rare domains and their features can be obtained starting from a set of compromised hosts (e.g., hosts contacting potential C&C domains confirmed as malicious).

As mentioned previously, linear regression is applied on the training data in order to determine feature weights and significance. Simulations based on actual enterprise data indicate that, among the eight features described above, the only one with low significance was IP16, as it is highly correlated with IP24. The most relevant features identified were RareUA, DomInterval, IP24 and DomAge. Again, the particular features that are deemed relevant can vary from enterprise to enterprise.

The function Compute_SimScore from Algorithm 1 is illustratively implemented as returning 1 if the domain similarity score is above the chosen threshold and 0 otherwise.

As described above, the dynamic histogram method can be configured with two parameters: bin width (W), and the threshold ($J_T$) denoting the maximum Jeffrey distance between the two histograms. A connection with histogram at distance less than $J_T$ from the periodic histogram is considered automated. Intuitively, the larger W and $J_T$, the more resilience the method provides against randomization and outliers, but more legitimate connections are labeled automated.

In determining a suitable bin width, multiple distinct bin widths can be considered (e.g., 5, 10, 20 seconds) with a particular bin width and the threshold $J_T$ being selected according to the training data.

The relevance of the timing and IP similarity features can also be measured among malicious domains. For each known compromised host in the training data, the timestamp of its first connection to every visited rare domain is extracted. Connection intervals between two malicious domains are typically much shorter than between a malicious domain and a legitimate domain.

Also, similarity in IP space can be measured for malicious and legitimate domains in the training data. It has been found that it is unlikely for legitimate domains to reside in the same subnet with malicious ones.

In some embodiments, an automated domain is labeled as a potential C&C domain if it is contacted by at least two hosts at similar time periods (e.g., within 10 seconds). For computing domain similarity, a simple additive function of features can be utilized, such as a function of domain connectivity, timing correlation with a known malicious domain (e.g., value 1 if the domain is contacted close in time to a malicious domain and 0 otherwise), and proximity in the IP space with malicious domains (e.g., value 2 if same/24 subnet with a malicious domain, 1 if same/16 subnet with a malicious domain and 0 otherwise).

However, the particular parameters, features and other characteristics of these embodiments are illustrative only and should not be construed as limiting in any way.

The above-described illustrative embodiments provide significant advantages relative to conventional approaches.

For example, the illustrative embodiments implement techniques for detection of suspicious domains through graph inference algorithm processing of host-domain contacts. Such an arrangement in some embodiments advantageously permits a network security system to focus its efforts on the particular ones of its host devices that have been exposed to the detected suspicious domains.

Accordingly, the limited resources of the network security system available for malware infection remediation can be more intelligently and effectively deployed in the computer network, resulting in improved performance as well as enhanced security against both APTs and new malware strains.

Some of the embodiments focus on detecting early-stage infections within enterprise perimeters, including communications related to malware delivery and automated C&C. These embodiments are illustratively configured to exploit the relationship between malicious domains associated with the same attack campaign, and to detect them by a graph-theoretic framework based on belief propagation.

In addition, embodiments of the invention through data normalization and reduction are scalable to handle the high-volume security logs typically generated by a large enterprise.

Simulations performed on actual enterprise data in certain embodiments demonstrate that such embodiments can accurately identify malicious domains, with a very low rate of false positives.

Moreover, these and other embodiments can detect entirely new attacks overlooked by state-of-the-art security products.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, suspicious domain detectors, command and control detectors, graph inference algorithms and malware infection remediation can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:
1. A method comprising steps of:
obtaining data relating to communications initiated by host devices of a computer network of an enterprise;
processing the data to identify external domains contacted by the host devices in conjunction with the communications;

applying a graph inference algorithm to analyze contacts of the host devices with the external domains in order to characterize one or more of the external domains as suspicious domains; and configuring one or more of the host devices to counteract malware infection from the suspicious domains;

wherein the graph inference algorithm comprises a belief propagation algorithm;

wherein the belief propagation algorithm models the contacts of the host devices with the external domains using a bipartite graph structure comprising:

host device vertices corresponding to respective ones of the host devices;

external domain vertices corresponding to respective ones of the external domains; and edges connecting particular ones of the host device vertices with particular ones of the external domain vertices;

wherein applying the graph inference algorithm comprises generating a score for each of at least a subset of the external domains in a given one of a plurality of iterations of the belief propagation algorithm;

wherein the scores are utilized to characterize the one or more external domains as suspicious domains in the given iteration; and wherein the steps are performed by at least one processing device comprising a processor coupled to a memory.

2. The method of claim 1 wherein a given one of the edges connects a given host device vertex to a given external domain vertex if the corresponding host device has contacted the corresponding external domain at least once during a specified observation window.

3. The method of claim 1 wherein the belief propagation algorithm is configured to identify particular ones of the external domains that are associated with a common attack campaign against the enterprise.

4. The method of claim 1 wherein the belief propagation algorithm is configured to update a set of rare domains in each of at least a subset of the plurality of iterations.

5. The method of claim 4 wherein the set of rare domains comprises particular ones of the external domains that are contacted on only a relatively infrequent basis within a specified observation window by only a relatively small subset of the host devices.

6. The method of claim 4 wherein in a given one of the plurality of iterations of the belief propagation algorithm a score is generated for each of the domains in the set of rare domains based at least in part on one or more of:

a first set of features indicative of command and control behavior; and a second set of features indicative of similarity between the domain and one or more suspicious domains as determined in a previous iteration of the belief propagation algorithm;

wherein the scores are utilized to characterize a subset of the set of rare domains as suspicious domains in the given iteration.

7. The method of claim 6 wherein the first set of features indicative of command and control behavior comprises one or more of:

presence of automated connections with regular timing patterns;

number of host devices contacting the domain;

fraction of host devices contacting the domain without a web referrer;

presence of rare user-agent strings;

fraction of host devices contacting the domain with no user-agent string or a rare user-agent string;

number of days since registration of the domain; and number of days until expiration of registration of the domain.

8. The method of claim 6 wherein the second set of features indicative of similarity between the domain and one or more suspicious domains as determined in the previous iteration comprises one or more of:

number of host devices contacting the domain;

fraction of host devices contacting the domain without a web referrer;

presence of rare user-agent strings;

fraction of host devices contacting the domain with no user-agent string or a rare user-agent string;

number of days since registration of the domain;

number of days until expiration of registration of the domain;

length of time between a given host device contacting one of the suspicious domains and the given host device contacting another one of the suspicious domains; and proximity in internet protocol address space between the domain and the one or more suspicious domains.

9. The method of claim 6 wherein at least a subset of the first and second sets of features are weighted in accordance with weights determined by at least one linear regression model generated in a training phase.

10. The method of claim 6 wherein the belief propagation algorithm returns a list of suspicious domains ranked in order of their respective scores.

11. The method of claim 10 wherein the belief propagation algorithm terminates responsive to at least one of:

a highest score among the scores of the suspicious domains being below a threshold; and a maximum number of iterations being reached.

12. The method of claim 1 wherein the belief propagation algorithm is configured for operation in a hint mode in which the belief propagation algorithm is initiated with one or more seeds corresponding to respective known suspicious domains.

13. The method of claim 12 wherein a given one of the seeds utilized to initiate the belief propagation algorithm in the hint mode is provided by a security operations center of the enterprise based at least in part on a corresponding indicator of compromise.

14. The method of claim 1 wherein the belief propagation algorithm is configured for operation in a no-hint mode in which the belief propagation algorithm is initiated without any seeds corresponding to respective known suspicious domains.

15. The method of claim 14 wherein in the no-hint mode the belief propagation algorithm is initiated with one or more seeds corresponding to respective ones of the external domains determined to being associated with command and control behavior.

16. The method of claim 1 wherein obtaining data relating to communications initiated by host devices comprises obtaining at least a portion of the data from security logs of the enterprise wherein said security logs comprise at least one of:

domain name service logs of the enterprise; and web proxy logs of the enterprise.

17. A non-transitory processor-readable storage medium having stored therein program code of one or more software programs, wherein the program code when executed by at least one processing device causes said at least one processing device:

to obtain data relating to communications initiated by host devices of a computer network of an enterprise;

to process the data to identify external domains contacted by the host devices in conjunction with the communications;

to apply a graph inference algorithm to analyze contacts of the host devices with the external domains in order to characterize one or more of the external domains as suspicious domains; and to configure one or more of the host devices to counteract malware infection from the suspicious domains;

wherein the graph inference algorithm comprises a belief propagation algorithm;

wherein the belief propagation algorithm models the contacts of the host devices with the external domains using a bipartite graph structure comprising:

host device vertices corresponding to respective ones of the host devices;

external domain vertices corresponding to respective ones of the external domains; and edges connecting particular ones of the host device vertices with particular ones of the external domain vertices;

wherein applying the graph inference algorithm comprises generating a score for each of at least a subset of the external domains in a given one of a plurality of iterations of the belief propagation algorithm; and wherein the scores are utilized to characterize the one or more external domains as suspicious domains in the given iteration.

18. The processor-readable storage medium of claim 17 wherein the storage medium comprises at least one of an electronic memory and a storage disk.

19. An apparatus comprising:
at least one processing device comprising a processor coupled to a memory;
said at least one processing device being configured:
to obtain data relating to communications initiated by host devices of a computer network of an enterprise;
to process the data to identify external domains contacted by the host devices in conjunction with the communications;
to apply a graph inference algorithm to analyze contacts of the host devices with the external domains in order to characterize one or more of the external domains as suspicious domains; and
to configure one or more of the host devices to counteract malware infection from the suspicious domains;
wherein the graph inference algorithm comprises a belief propagation algorithm;
wherein the belief propagation algorithm models the contacts of the host devices with the external domains using a bipartite graph structure comprising:
host device vertices corresponding to respective ones of the host devices;
external domain vertices corresponding to respective ones of the external domains; and
edges connecting particular ones of the host device vertices with particular ones of the external domain vertices;
wherein applying the graph inference algorithm comprises generating a score for each of at least a subset of the external domains in a given one of a plurality of iterations of the belief propagation algorithm; and
wherein the scores are utilized to characterize the one or more external domains as suspicious domains in the given iteration.

20. The apparatus of claim 19 wherein the apparatus is implemented in a network security system.

21. The apparatus of claim 19 wherein the belief propagation algorithm is configured for operation in a hint mode in which the belief propagation algorithm is initiated with one or more seeds corresponding to respective known suspicious domains.

22. The apparatus of claim 21 wherein a given one of the seeds utilized to initiate the belief propagation algorithm in the hint mode is provided by a security operations center of the enterprise based at least in part on a corresponding indicator of compromise.

* * * * *